US012566364B2

(12) United States Patent
Jackson et al.

(10) Patent No.: US 12,566,364 B2
(45) Date of Patent: Mar. 3, 2026

(54) PROJECTION SYSTEM AND METHOD WITH ADJUSTABLE ANGLE ILLUMINATION USING LENS DECENTRATION

(71) Applicant: Dolby Laboratories Licensing Corporation, San Francisco, CA (US)

(72) Inventors: John David Jackson, Allen, TX (US); Darren Hennigan, Prosper, TX (US); Nathan Shawn Wainwright, Melissa, TX (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 500 days.

(21) Appl. No.: 18/249,748

(22) PCT Filed: Oct. 21, 2021

(86) PCT No.: PCT/US2021/056118
§ 371 (c)(1),
(2) Date: Apr. 20, 2023

(87) PCT Pub. No.: WO2022/087318
PCT Pub. Date: Apr. 28, 2022

(65) Prior Publication Data
US 2023/0384656 A1 Nov. 30, 2023

Related U.S. Application Data

(60) Provisional application No. 63/104,845, filed on Oct. 23, 2020.

(51) Int. Cl.
*G03B 21/14* (2006.01)
*G03B 5/02* (2021.01)
(Continued)

(52) U.S. Cl.
CPC ............. *G03B 21/142* (2013.01); *G03B 5/02* (2013.01); *G03B 21/008* (2013.01); *G03B 21/2066* (2013.01); *H04N 9/3191* (2013.01)

(58) Field of Classification Search
None
See application file for complete search history.

(56) References Cited

U.S. PATENT DOCUMENTS 3,659,918 A 5/1972 Tan
5,633,755 A 5/1997 Manabe
(Continued)

FOREIGN PATENT DOCUMENTS

CN 1797065 A 7/2006
CN 101305310 A 11/2008
(Continued)

OTHER PUBLICATIONS

Jinyoung Roh et al: "Full-color holographic projection display system featuring an achromatic Fourier filter", Optics Express, Jun. 19, 2017 (Jun. 19, 2017), p. 14774-14782, XP055533147, OSA publishing DOI: 10.1364/OE.25.014774 Retrieved from the Internet: URL:https://www.osapublishing.org/OE/fulltext.cfm?uri=oe-25-13-14774&id=368165 [retrieved on Dec. 11, 2018].
(Continued)

*Primary Examiner* — Bao-Luan Q Le
*Assistant Examiner* — Danell L Owens

(57) ABSTRACT

A projection system and calibration method therefor relate to a light source configured to emit a light in response to an image data, an illumination optical system configured to steer the light, the illumination optical system including a first lens group and a second lens group, a digital micromirror device (DMD) including a plurality of micromirrors respectively configured to reflect the steered light to a predetermined location as on-state light or to reflect the
(Continued)

steered light as off-state light to a light dump; determining a deviation between an actual angle of orientation and an expected angle of orientation of a respective micromirror of the plurality of micromirrors; calculating a first amount of lateral adjustment corresponding to the first lens group and a second amount of lateral adjustment corresponding to the second lens group, and actuating the first and second lens groups according to the corresponding first and second amount.

20 Claims, 7 Drawing Sheets

(51) Int. Cl.

| | | |
|---|---|---|
| *G03B 21/00* | (2006.01) | |
| *G03B 21/20* | (2006.01) | |
| *H04N 9/31* | (2006.01) | |

(56) References Cited

U.S. PATENT DOCUMENTS

| | | | |
|---|---|---|---|
| 5,644,432 A | 7/1997 | Doany | |
| 6,333,820 B1 | 12/2001 | Hayakawa | |
| 6,577,429 B1 | 6/2003 | Kurtz | |
| 6,663,243 B2 | 12/2003 | Fielding et al. | |
| 6,676,260 B2 | 1/2004 | Cobb | |
| 6,707,537 B2 | 3/2004 | Dieckmann | |
| 6,809,873 B2 | 10/2004 | Cobb | |
| 6,869,190 B2 | 3/2005 | Tooru | |
| 6,897,992 B2 | 5/2005 | Kikuchi | |
| 7,004,586 B2 | 2/2006 | Morinaga | |
| 7,072,096 B2 | 7/2006 | Holman | |
| 7,095,560 B2 | 8/2006 | Toyoda | |
| 7,180,554 B2 | 2/2007 | Divelbiss | |
| 7,204,599 B2 | 4/2007 | Lerner | |
| 7,222,974 B2 | 5/2007 | Tomita | |
| 7,289,090 B2 | 10/2007 | Morgan | |
| 7,334,898 B2 | 2/2008 | Seto | |
| 7,359,026 B2 | 4/2008 | Bullwinkel | |
| 7,384,158 B2 | 6/2008 | Ramachandran | |
| 7,433,126 B2 | 10/2008 | Hashimoto | |
| 7,445,344 B2 | 11/2008 | Lang | |
| 7,639,419 B2 | 12/2009 | Chuang | |
| 7,659,880 B2 | 2/2010 | Miyazawa | |
| 7,665,850 B2 | 2/2010 | Penn | |
| 7,784,949 B2 | 8/2010 | Yamauchi | |
| 7,871,165 B2 | 1/2011 | Silverstein | |
| 7,926,951 B2 | 4/2011 | Bietry | |
| 7,938,541 B2 | 5/2011 | Mizushima | |
| 7,952,806 B2 | 5/2011 | Callen | |
| 7,959,297 B2 | 6/2011 | Silverstein et al. | |
| 7,993,014 B2 | 8/2011 | Penn | |
| 8,033,666 B2 | 10/2011 | Silverstein | |
| 8,066,382 B2 | 11/2011 | Silverstein | |
| 8,066,389 B2 | 11/2011 | Silverstein | |
| 8,125,702 B2 | 2/2012 | Ward | |
| 8,132,919 B2 | 3/2012 | Harland | |
| 8,198,573 B2 | 6/2012 | Kamijima | |
| 8,220,931 B2 | 7/2012 | Silverstein | |
| 8,231,226 B2 | 7/2012 | Inoue | |
| 8,235,531 B2 | 8/2012 | Silverstein | |
| 8,287,129 B2 | 10/2012 | Kurtz | |
| 8,292,438 B2 | 10/2012 | Nishikawa | |
| 8,305,502 B2 | 11/2012 | Silverstein | |
| 8,379,322 B2 | 2/2013 | Smith | |
| 8,444,275 B2 | 5/2013 | Kurtz | |
| 8,531,492 B2 | 9/2013 | Wallener | |
| 8,649,094 B2 | 2/2014 | Kurtz | |
| 8,684,533 B2 | 4/2014 | Whitehead | |
| 8,724,086 B2 | 5/2014 | Layh | |
| 8,786,943 B2 | 7/2014 | Silverstein | |
| 8,820,941 B2 | 9/2014 | Yang | |
| 8,830,580 B2 | 9/2014 | Kurtz | |
| 8,860,640 B2 | 10/2014 | Perkins | |
| 8,861,078 B2 | 10/2014 | Huang | |
| RE45,258 E | 11/2014 | Takaura | |
| 8,890,905 B2 | 11/2014 | Kwong | |
| 9,135,864 B2 | 9/2015 | Shields | |
| 9,609,263 B2 | 3/2017 | Nagasawa | |
| 9,664,984 B2 | 5/2017 | Nakamura | |
| 9,664,989 B2 | 5/2017 | Bommerbach | |
| 9,690,179 B2 | 6/2017 | Shibayama | |
| 9,723,278 B2 | 8/2017 | Davis | |
| 9,915,820 B2 | 3/2018 | Kurtz | |
| 9,983,484 B2 | 5/2018 | Endres | |
| 10,073,336 B2 | 9/2018 | Maes | |
| 10,345,591 B2 | 7/2019 | Samec | |
| 10,620,521 B2 | 4/2020 | Hsu | |
| 2002/0001030 A1 | 1/2002 | Kuiseko | |
| 2002/0051141 A1 | 5/2002 | Kito | |
| 2003/0038928 A1* | 2/2003 | Alden | H04N 5/74 |
| | | | 348/E5.143 |
| 2003/0147052 A1 | 8/2003 | Penn | |
| 2003/0147158 A1 | 8/2003 | Penn | |
| 2004/0061917 A1 | 4/2004 | Mushika | |
| 2004/0070695 A1 | 4/2004 | Kim | |
| 2004/0184007 A1 | 9/2004 | Silverstein | |
| 2005/0046810 A1 | 3/2005 | Nakamura | |
| 2005/0168697 A1 | 8/2005 | Bruzzone | |
| 2005/0168708 A1 | 8/2005 | Huang | |
| 2006/0007401 A1 | 1/2006 | Ho | |
| 2006/0044525 A1 | 3/2006 | Lee | |
| 2006/0256295 A1 | 11/2006 | Lang | |
| 2006/0279713 A1 | 12/2006 | Wang | |
| 2007/0024945 A1 | 2/2007 | Huang | |
| 2007/0085970 A1 | 4/2007 | Yoshida | |
| 2007/0103788 A1 | 5/2007 | Magarill | |
| 2007/0252957 A1 | 11/2007 | Penn | |
| 2008/0007699 A1 | 1/2008 | Pettitt | |
| 2008/0084545 A1 | 4/2008 | Chen | |
| 2009/0009730 A1 | 1/2009 | Destain | |
| 2009/0153752 A1 | 6/2009 | Silverstein | |
| 2009/0296242 A1 | 12/2009 | Callen | |
| 2010/0253927 A1 | 10/2010 | Tanitsu | |
| 2011/0013144 A1 | 1/2011 | Silverstein et al. | |
| 2011/0109820 A1 | 5/2011 | Silverstein | |
| 2011/0279749 A1 | 11/2011 | Erinjippurath | |
| 2012/0033421 A1 | 2/2012 | Kojima | |
| 2012/0140186 A1 | 6/2012 | Kuwata | |
| 2012/0182484 A1 | 7/2012 | Imai | |
| 2012/0212841 A1 | 8/2012 | Wang | |
| 2013/0033685 A1 | 2/2013 | Katou | |
| 2013/0038846 A1 | 2/2013 | Kojima | |
| 2013/0107357 A1 | 5/2013 | Silverstein | |
| 2013/0114819 A1 | 5/2013 | Melchior | |
| 2013/0128232 A1 | 5/2013 | Laino | |
| 2013/0162954 A1 | 6/2013 | Huang | |
| 2014/0028697 A1 | 1/2014 | Kurtz | |
| 2014/0028698 A1 | 1/2014 | Maier | |
| 2014/0028699 A1 | 1/2014 | Kurtz | |
| 2014/0327885 A1 | 11/2014 | Mansur | |
| 2014/0347634 A1 | 11/2014 | Bommerbach | |
| 2015/0124330 A1 | 5/2015 | Ito | |
| 2015/0338729 A1 | 11/2015 | Kawasumi | |
| 2016/0033757 A1 | 2/2016 | Kurtz | |
| 2018/0007327 A1 | 1/2018 | Richards | |
| 2018/0143427 A1 | 5/2018 | Griffin | |
| 2019/0129295 A1 | 5/2019 | Li | |
| 2020/0355894 A1 | 11/2020 | Syvokin | |
| 2021/0141238 A1 | 5/2021 | Pertierra | |
| 2022/0005111 A1 | 1/2022 | Trimble | |
| 2022/0191440 A1 | 6/2022 | Pertierra | |

FOREIGN PATENT DOCUMENTS

| | | |
|---|---|---|
| CN | 102540755 A | 7/2012 |
| CN | 102629072 A | 8/2012 |
| CN | 102027747 B | 11/2013 |
| CN | 103189793 B | 4/2015 |
| CN | 103890640 B | 8/2015 |
| CN | 104656361 B | 6/2016 |
| CN | 205374966 U | 7/2016 |

(56)                References Cited

FOREIGN PATENT DOCUMENTS

| | | | |
|---|---|---|---|
| CN | 104330897 | B | 8/2016 |
| CN | 104220920 | B | 12/2017 |
| CN | 207337053 | U | 5/2018 |
| CN | 109581789 | A | 4/2019 |
| CN | 107113409 | B | 1/2020 |
| CN | 211627931 | U | 10/2020 |
| CN | 110073290 | B | 7/2021 |
| CN | 115427865 | A | 12/2022 |
| EP | 3241073 | B1 | 9/2020 |
| JP | 2000266915 | A | 9/2000 |
| JP | 2001174909 | A | 6/2001 |
| JP | 2003121784 | A | 4/2003 |
| JP | 2003322822 | A | 11/2003 |
| JP | 2004279498 | A | 10/2004 |
| JP | 2004343003 | A * | 12/2004 |
| JP | 2005148208 | A | 6/2005 |
| JP | 2006065192 | A | 3/2006 |
| JP | 2006509243 | A | 3/2006 |
| JP | 2007047799 | A | 2/2007 |
| JP | 2007520756 | A | 7/2007 |
| JP | 2007206143 | A | 8/2007 |
| JP | 2007279436 | A | 10/2007 |
| JP | 2007534004 | A | 11/2007 |
| JP | 2008083415 | A | 4/2008 |
| JP | 2008520165 | A | 6/2008 |
| JP | 2008181070 | A | 8/2008 |
| JP | 2009516214 | A | 4/2009 |
| JP | 2011248062 | A | 12/2011 |
| JP | 2012098366 | A | 5/2012 |
| JP | 2012115879 | A | 6/2012 |
| JP | 2012123128 | A | 6/2012 |
| JP | 2013097123 | A | 5/2013 |
| JP | 2014048392 | A | 3/2014 |
| JP | 5484258 | B2 | 5/2014 |
| JP | 2014083562 | A | 5/2014 |
| JP | 2015230346 | A | 12/2015 |
| JP | 2016517029 | A | 6/2016 |
| JP | 2018084819 | A | 5/2018 |
| TW | 200303447 | A | 9/2003 |
| TW | 201608324 | A | 3/2016 |
| WO | 2013151747 | A1 | 10/2013 |
| WO | 2014132675 | A1 | 9/2014 |
| WO | 2014142967 | A1 | 9/2014 |
| WO | 2015194454 | A1 | 12/2015 |
| WO | 2019119099 | A1 | 6/2019 |
| WO | 2019195182 | A1 | 10/2019 |
| WO | 2020089523 | A1 | 5/2020 |
| WO | 2021113553 | A1 | 6/2021 |
| WO | 2021214380 | A1 | 10/2021 |

OTHER PUBLICATIONS

Kwok H.S. et al., "Trichroic prism assembly for separating and recombining colors in a compact projection display", Applied Optics, vol. 39, No. 1, pp. 168-172, Jan. 1, 2000.

Martin J Morrell et al: "Audio Engineering Society Convention Paper 7931 Dynamic Panner: An Adaptive Digital Audio Effect for Spatial Audio", Oct. 1, 2009 (Oct. 1, 2009), XP055668267, Retrieved from the Internet: URL:http://www.aes.org/e-lib/inst/download.cfm/15126.pdf?ID=15126 [retrieved on Feb. 13, 2020] paragraphs [002.], [003.], [06. 3]; figure 8.

Chen, Yu-Jia, et al."Designing an Anamorphic Illumination System with an RTIR prism for a tile-and-roll-pixel-type Projector" Applied Optics, vol. 59, Issue 12, pp. 3530-3537, Apr. 20, 2020, 8 pages.

Jian, Y. et al."A field lens design of illumination and projection optics for dynamic infrared scene generator based on DMD" 6th International Symposium On Advanced Optical Manufacturing and Testing Technologies: Design, Manufacturing, and Testing of Smart Structures, Micro- and Nano-Optical Devices, and Systems Book Series: Proceedings of SPIE (vol. 8418 Article No. 84180N Published: 2012, pp. 1-3, 3 pages.

Rausch, D. et al."Phase Space Approach to the use of Integrator rods and Optical Arrays in Illumination Systems" Adv. Opt. Techn., vol. 1, 2012, pp. 69-78, pp. 1-14, 14 pages.

Ronneberger, O. et al. "U-net: Convolutional networks for biomedical image segmentation," in International Conference on Medical image computing and computer-assisted intervention. Springer, 2015, pp. 234-241, 8 pages.

* cited by examiner

401 — Determine DMD Angle

402 — Calculate Lateral Adjustment of Lens Groups

403 — Actuate Lens Groups

601  Move Lens Groups to Center of Travel Range

602  Install Projection Aperture Filter

603  Adjust 2nd Lens Group Until Center of Diffraction Pattern from DMD is Centered 604  Further Adjust 2nd Lens Group 605  Adjust 1st Lens Group in Opposite Direction until Diffraction Pattern from DMD is Centered

PROJECTION SYSTEM AND METHOD WITH ADJUSTABLE ANGLE ILLUMINATION USING LENS DECENTRATION

CROSS-REFERENCE TO RELATED APPLICATIONS

This application is a U.S. National Stage of International Application No. PCT/US2021/056118, filed Oct. 21, 2021, which claims priority to U.S. Provisional Application No. 63/104,845 filed on Oct. 23, 2020, which is incorporated by reference in its entirety.

BACKGROUND

1. Field of the Disclosure

This application relates generally to projection systems and methods of driving a projection system.

2. Description of Related Art

Digital projection systems typically utilize a light source and an optical system to project an image onto a surface or screen. The optical system includes components such as mirrors, lenses, waveguides, optical fibers, beam splitters, diffusers, spatial light modulators (SLMs), and the like. The contrast of a projector indicates the brightest output of the projector relative to the darkest output of the projector. Contrast ratio is a quantifiable measure of contrast, defined as a ratio of the luminance of the projector's brightest output to the luminance of the projector's darkest output. This definition of contrast ratio is also referred to as "static" or "native" contrast ratio.

Some projection systems are based on SLMs that implement a spatial amplitude modulation. In such a system, the light source may provide a light field that embodies the brightest level that can be reproduced on the image, and light is attenuated or discarded in order to create the desired scene levels. Some high contrast examples of projection systems based on this architecture use a semi-collimated illumination system and a small aperture stop in the projection optics to improve contrast. In such architectures, the illumination angle on the SLM has a substantial effect on the projected image, including but not limited to effects on the contrast ratio and the clarity of the projected image.

BRIEF SUMMARY OF THE DISCLOSURE

Various aspects of the present disclosure relate to devices, systems, and methods for projection display a high-contrast projection architecture.

In one exemplary aspect of the present disclosure, there is provided a projection system comprising a light source configured to emit a light in response to an image data; an illumination optical system configured to steer the light, the illumination optical system including a first lens group and a second lens group; a digital micromirror device including a plurality of micromirrors, wherein a respective micromirror is configured to reflect the steered light to a predetermined location as on-state light in a case where the respective micromirror is in an on position and to reflect the steered light to a light dump as off-state light in a case where the respective micromirror is in an off position; and a controller configured to: determine a deviation between an actual angle of orientation of a respective micromirror of the plurality of micromirrors of the digital micromirror device and an expected angle of orientation of the respective micromirror of the plurality of micromirrors of the digital micromirror device, calculate a first amount of lateral adjustment corresponding to the first lens group and a second amount of lateral adjustment corresponding to the second lens group, and actuate the first lens group in a first direction according to the first amount and the second lens group in a second direction according to the second amount, thereby to maintain a position of the steered light on the digital micromirror device.

In another exemplary aspect of the present disclosure, there is provided a method of calibrating a projection system including a light source configured to emit a light in response to an image data, an illumination optical system configured to steer the light, the illumination optical system including a first lens group and a second lens group, and a digital micromirror device including a plurality of micromirrors respectively configured to reflect the steered light to a predetermined location as on-state light in a case where the respective micromirror is in an on position and to reflect the steered light to a light dump as off-state light in a case where the respective micromirror is in an off position, the method comprising: determining a deviation between an actual angle of orientation of a respective micromirror of the plurality of micromirrors of the digital micromirror device and an expected angle of orientation of the respective micromirror of the plurality of micromirrors of the digital micromirror device, calculating a first amount of lateral adjustment corresponding to the first lens group and a second amount of lateral adjustment corresponding to the second lens group, and actuating the first lens group in a first direction according to the first amount and the second lens group in a second direction according to the second amount, thereby to maintain a position of the steered light on the digital micromirror device.

In another exemplary aspect of the present disclosure, there is provided a non-transitory computer-readable medium storing instructions that, when executed by a processor of a projection device including a light source configured to emit a light in response to an image data, an illumination optical system configured to steer the light, the illumination optical system including a first lens group and a second lens group, and a digital micromirror device including a plurality of micromirrors respectively configured to reflect the steered light to a predetermined location as on-state light in a case where the respective micromirror is in an on position and to reflect the steered light to a light dump as off-state light in a case where the respective micromirror is in an off position, cause the projection device to perform operations comprising determining a deviation between an actual angle of orientation of a respective micromirror of the plurality of micromirrors of the digital micromirror device and an expected angle of orientation of the respective micromirror of the plurality of micromirror of the digital micromirror device, calculating a first amount of lateral adjustment corresponding to the first lens group and a second amount of lateral adjustment corresponding to the second lens group, and actuating the first lens group in a first direction according to the first amount and the second lens group in a second direction according to the second amount, thereby to maintain a position of the steered light on the digital micromirror device.

In this manner, various aspects of the present disclosure provide for the display of images having a high dynamic range and high resolution, and effect improvements in at least the technical fields of image projection, holography, signal processing, and the like.

DESCRIPTION OF THE DRAWINGS

These and other more detailed and specific features of various embodiments are more fully disclosed in the following description, reference being had to the accompanying drawings, in which.

DETAILED DESCRIPTION

Figure 1:
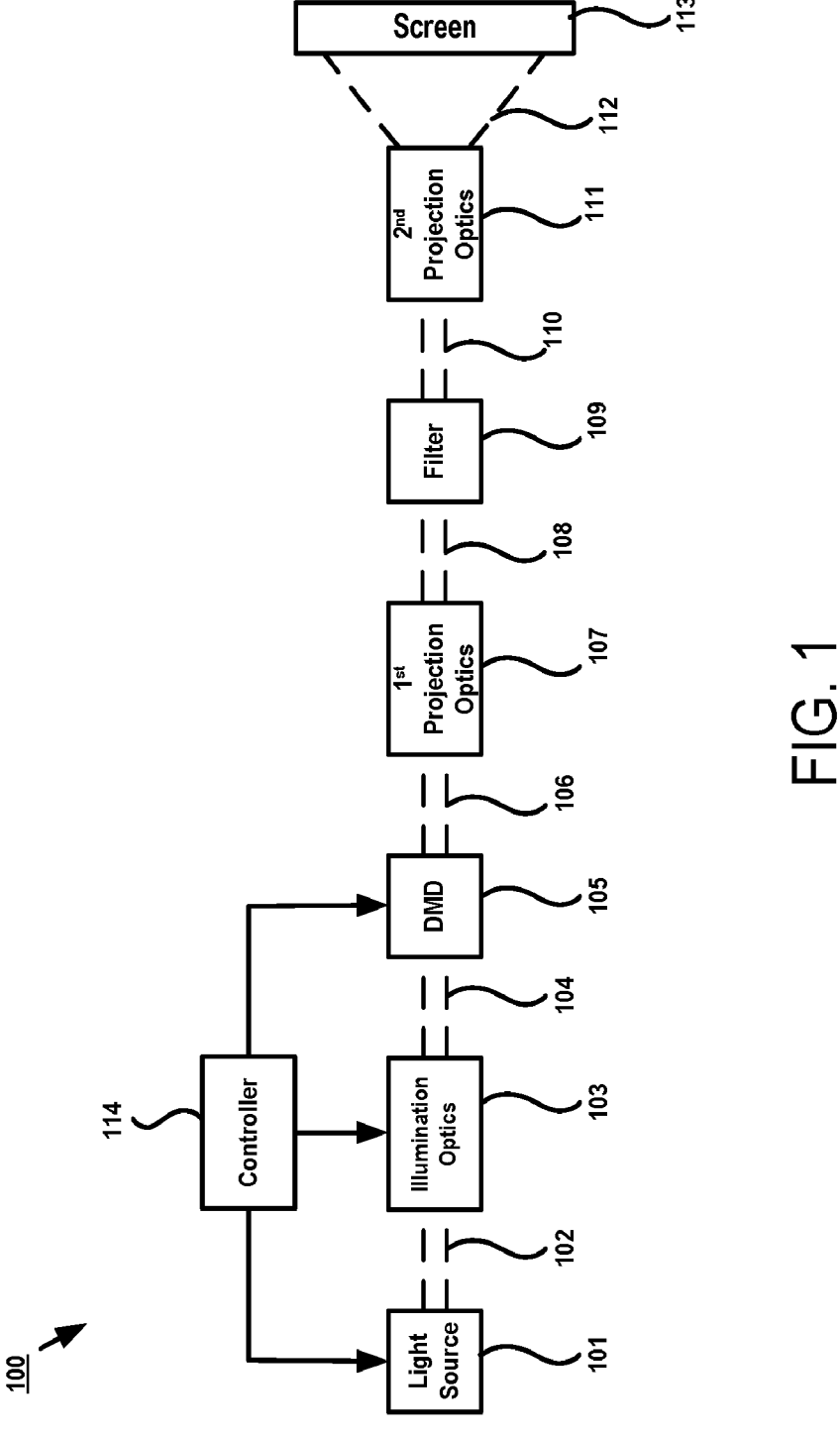
FIG. 1 illustrates a block diagram of an exemplary projection system according to various aspects of the present disclosure.

This disclosure and aspects thereof can be embodied in various forms, including hardware, devices, or circuits controlled by computer-implemented methods, computer program products, computer systems and networks, user interfaces, and application programming interfaces; as well as hardware-implemented methods, signal processing circuits, memory arrays, application specific integrated circuits (ASICs), field programmable gate arrays (FPGAs), and the like. The foregoing summary is intended solely to give a general idea of various aspects of the present disclosure, and does not limit the scope of the disclosure in any way.

In the following description, numerous details are set forth, such as optical device configurations, timings, operations, and the like, in order to provide an understanding of one or more aspects of the present disclosure. It will be readily apparent to one skilled in the art that these specific details are merely exemplary and not intended to limit the scope of this application.

Moreover, while the present disclosure focuses mainly on examples in which the various circuits are used in digital projection systems, it will be understood that this is merely one example of an implementation. It will further be understood that the disclosed systems and methods can be used in any device in which there is a need to project light; for example, cinema, consumer, and other commercial projection systems, heads-up displays, virtual reality displays, and the like.

Projector Systems

The optics of an SLM-based projection system may be broadly categorized into two parts: the optics located on the illumination side (i.e., optically upstream of the SLM) and the optics located on the projection side (i.e., optically downstream of the SLM). The SLM itself includes a plurality of modulating elements arranged in, for example, a two-dimensional array. Individual modulating elements receive light from the illumination optics and convey light to the projection optics. In some examples, the SLM may be implemented as a digital micromirror device (DMD); this will be discussed in more detail below. Generally, however, a DMD includes a two-dimensional array of reflective elements (micromirrors or simply "mirrors") which selectively reflect light towards the projection optics or discard light based on the position of the individual reflective elements.

As noted above, a high contrast projection system which uses a semi-collimated illumination system and a small aperture stop in the projection optics may be greatly affected by differences in the angle of incidence of the light on the DMD. To prevent degradation in the projected image, a projection system may maintain the position and focus of an output of the illumination optics (e.g., light output from an integrating rod or other uniformity correcting device and subsequently reflected by one or more reflective elements) on the DMD, while at the same time keeping the reflected beam centered in the aperture stop of the projection optics (e.g., a filter aperture). However, the exact position of the first and second angle of the DMD mirrors may be subject to manufacturing or other tolerances, such that the actual first and second angles may vary by some amount. In order to compensate for differences in DMD mirror angle between different physical DMDs and ensure that the beam is appropriately centered, one may control the angle of light exiting (e.g., reflecting from) the DMD. Such control should be robust to variations in the first and second angle of the DMD mirrors. The robustness against angle variations may be provided by implementing an adjustment of the angle of incidence of the beam onto the DMD so that, when reflected by the DMD mirrors, the exit beam is always at (or substantially at) the nominal designed exit angle to the aperture. Moreover, because each color channel in color projection systems may have a different angle requirement, it is desirable to provide an adjustment for each color.

The architecture of such high contrast projection systems may provide particular constraints in addition to the adjustment and maintenance of proper illumination angle. For example, the projection systems may utilize a prism where the three colors are recombined and/or a fold mirror before the prism to reduce the size footprint of the optics and the projector itself. Furthermore, as noted above, the image of the integrating rod should be centered on the DMD. Herein, examples of projection systems are described which are capable of adjusting the input angle to the DMD without changing the focus or position of the image of the integrating rod (or other uniformity correcting device) at the DMD.

FIG. 1 illustrates an exemplary high contrast projection system 100 according to various aspects of the present disclosure. In particular, FIG. 1 illustrates a projection system 100 which includes a light source 101 configured to emit a first light 102; illumination optics 103 (one example of an illumination optical system in accordance with the present disclosure) configured to receive the first light 102 and redirect or otherwise modify it, thereby to generate a second light 104; a DMD 105 configured to receive the second light 104 and selectively redirect and/or modulate it as a third light 106; first projection optics 107 configured to receive the third light 106 and project it as a fourth light 108; a filter 109 configured to filter the fourth light 108, thereby to generate a fifth light 110; and second projection optics 111 configured to receive the fifth light 110 and project it as a sixth light 112 onto a screen 113.

In practical implementations, the projection system 100 may include fewer optical components or may include additional optical components such as mirrors, lenses, waveguides, optical fibers, beam splitters, diffusers, and the like. With the exception of the screen 113, the components illustrated in FIG. 1 may, in one implementation, be integrated into a housing to provide a projection device. In other implementations, the projection system 100 may include multiple housings. For example, the light source 101, the illumination optics 103, and the DMD 105 may be provided in a first housing, and the first projection optics 107, the filter 109, and the second projection optics 111 may be provided in a second housing which may be mated with the first housing. In some further implementations, one or more of the housings may themselves include subassemblies. The one or more housings of such a projection device may include additional components such as a memory, input/ output ports, communication circuitry, a power supply, and the like.

The light source 101 may be, for example, a laser light source, an LED, and the like. Generally, the light source 101 is any light emitter which emits light. In some implementations, the light is coherent light. In some aspects of the present disclosure, the light source 101 may comprise multiple individual light emitters, each corresponding to a different wavelength or wavelength band. The light source 101 emits light in response to an image signal provided by the controller 114; for example, one or more processors such as a central processing unit (CPU) of the projection system 100. The image signal includes image data corresponding to a plurality of frames to be successively displayed. Individual elements in the projection system 100, including the illumination optics 103 and/or the DMD 105, may be controlled by the controller 114. The image signal may originate from an external source in a streaming or cloud-based manner, may originate from an internal memory of the projection system 100 such as a hard disk, may originate from a removable medium that is operatively connected to the projection system 100, or combinations thereof.

Although FIG. 1 illustrates a generally linear optical path, in practice the optical path is generally more complex. For example, in the projection system 100, the second light 104 from the illumination optics 103 is steered to the DMD chip 105 (or chips) at an oblique angle.

Figure 2A:
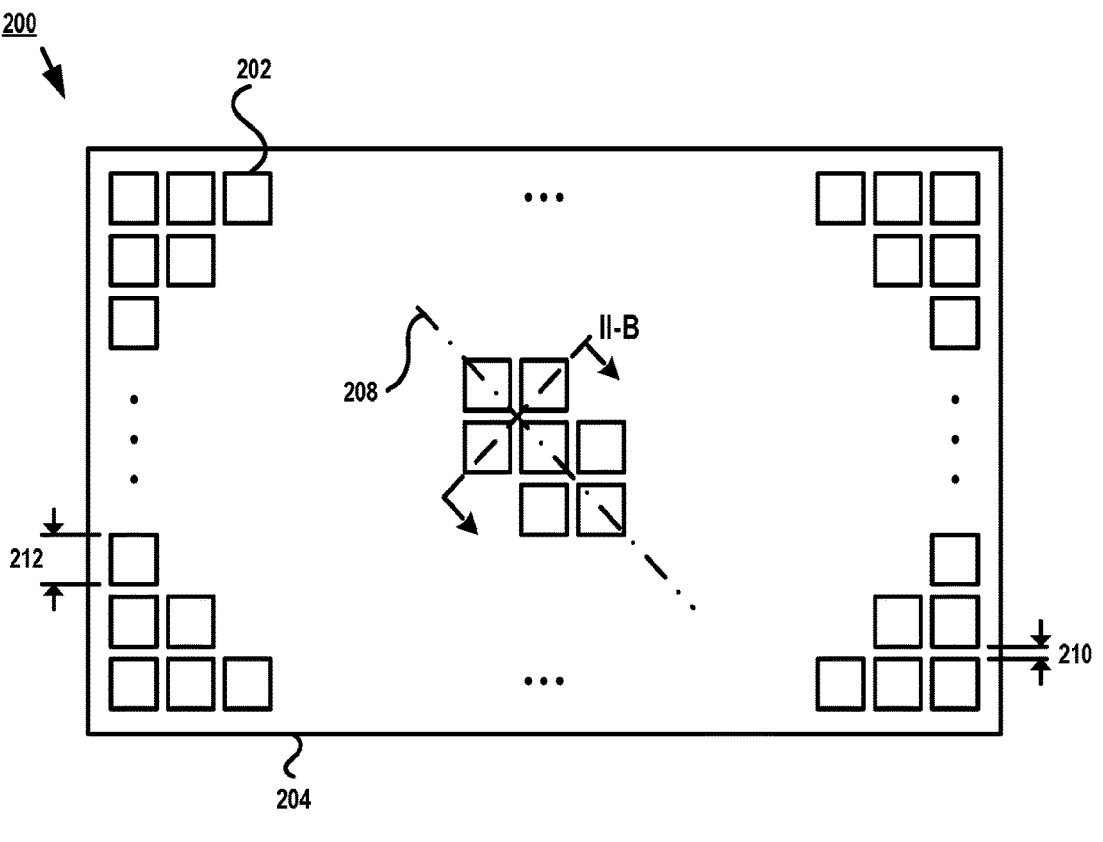
FIGS. 2A-2B illustrate views of an exemplary spatial light modulator for use with various aspects of the present disclosure.
Figure 2B:
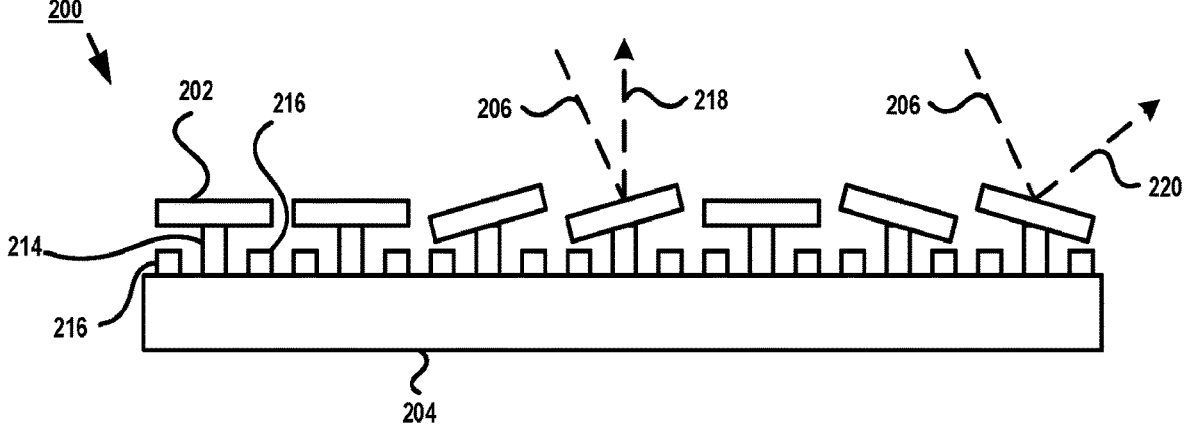

To illustrate the effects of the angle of incidence and the DMD mirrors, FIGS. 2A-2B show an exemplary DMD 200 in accordance with various aspects of the present disclosure. FIG. 2A illustrates a plan view of the DMD 200, and FIG. 2B illustrates partial cross-sectional view of the DMD 200. The DMD 200 includes a plurality of square micromirrors 202 arranged in a two-dimensional rectangular array on a substrate 204. In some examples, the DMD 200 may be a digital light processor (DLP) from Texas Instruments. Each micromirror 202 may correspond to one pixel of the eventual projection image, and may be configured to tilt about a rotation axis 208, shown for one particular subset of the micromirrors 202, by electrostatic or other actuation. The individual micromirrors 202 have a width 212 and are arranged with gaps of width 210 therebetween. The micromirrors 202 may be formed of or coated with any highly reflective material, such as aluminum or silver, to thereby specularly reflect light. The gaps between the micromirrors 202 may be absorptive, such that input light which enters a gap is absorbed by the substrate 204.

While FIG. 2A expressly shows only some representative micromirrors 202, in practice the DMD 200 may include many more individual micromirrors in a number equal to a resolution of the projection system 100. In some examples, the resolution may be 2K (2048×1080), 4K (4096×2160), 1080p (1920×1080), consumer 4K (3840×2160), and the like. Moreover, in some examples the micromirrors 202 may be rectangular and arranged in the rectangular array; hexagonal and arranged in a hexagonal array, and the like. Moreover, while FIG. 2A illustrates the rotation axis 208 extending in an oblique direction, in some implementations the rotation axis 208 may extend vertically or horizontally.

As can be seen in FIG. 2B, each micromirror 202 may be connected to the substrate 204 by a yoke 214, which is rotatably connected to the micromirror 202. The substrate 204 includes a plurality of electrodes 216. While only two electrodes 216 per micromirror 202 are visible in the cross-sectional view of FIG. 2B, each micromirror 202 may in practice include additional electrodes. While not particularly illustrated in FIG. 2B, the DMD 200 may further include spacer layers, support layers, hinge components to control the height or orientation of the micromirror 202, and the like. The substrate 204 may include electronic circuitry associated with the DMD 200, such as CMOS transistors, memory elements, and the like.

Depending on the particular operation and control of the electrodes 216, the individual micromirrors 202 may be switched between an "on" position, an "off" position, and an unactuated or neutral position. If a micromirror 202 is in the on position, it is actuated to an angle of (for example) −12° (that is, rotated counterclockwise by 12° relative to the neutral position) to specularly reflect input light 206 into on-state light 218. If a micromirror 202 is in the off position, it is actuated to an angle of (for example)+12° (that is, rotated clockwise by 12° relative to the neutral position) to specularly reflect the input light 206 into off-state light 220. The off-state light 220 may be directed toward a light dump that absorbs the off-state light 220. In some instances, a micromirror 202 may be unactuated and lie parallel to the substrate 204. The particular angles illustrated in FIGS. 2A-2B and described here are merely exemplary and not limiting. In some implementations, the on- and off-position angles may be between ±11 and ±13 degrees (inclusive), respectively.

In the context of FIG. 1, where the DMD mirrors use an angle tilt of 12° to reflect or discard light, the second light 104 is steered to the DMD chip 105 at a fixed angle of 24°. When an individual mirror is tilted at a first predetermined angle (e.g., −12°), the mirror is considered to be in the on state and redirects light toward the first projection optics 107, the filter 109, and the second projection optics 111 (e.g., a predetermined location). When an individual mirror is tilted at a second predetermined angle (e.g., +12°), the mirror is considered to be in the off state and redirects light to a light dump located outside the active image area.

In order to ensure that the image on the screen 113 has an acceptable clarity and contrast ratio, the illumination optics 103 may be designed and/or controlled to ensure that the angle of incidence on the DMD 105 is correct, while maintaining the position of the second light 104 centered on the DMD 105.

Dual Lens Groups Control System

Figure 3A:
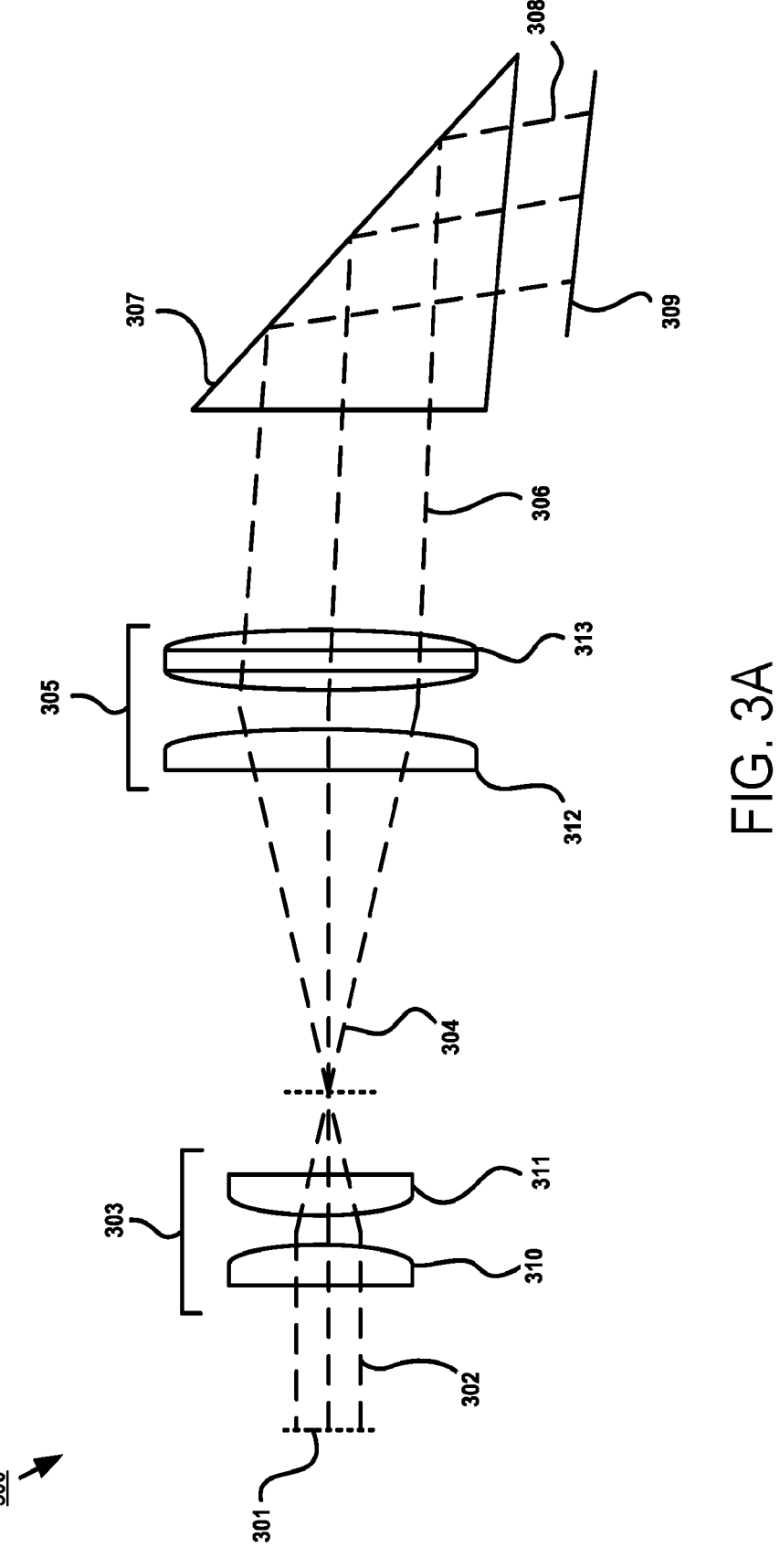
FIGS. 3A-3B illustrate exemplary optical states in an exemplary projection system according to various aspects of the present disclosure.
Figure 3B:
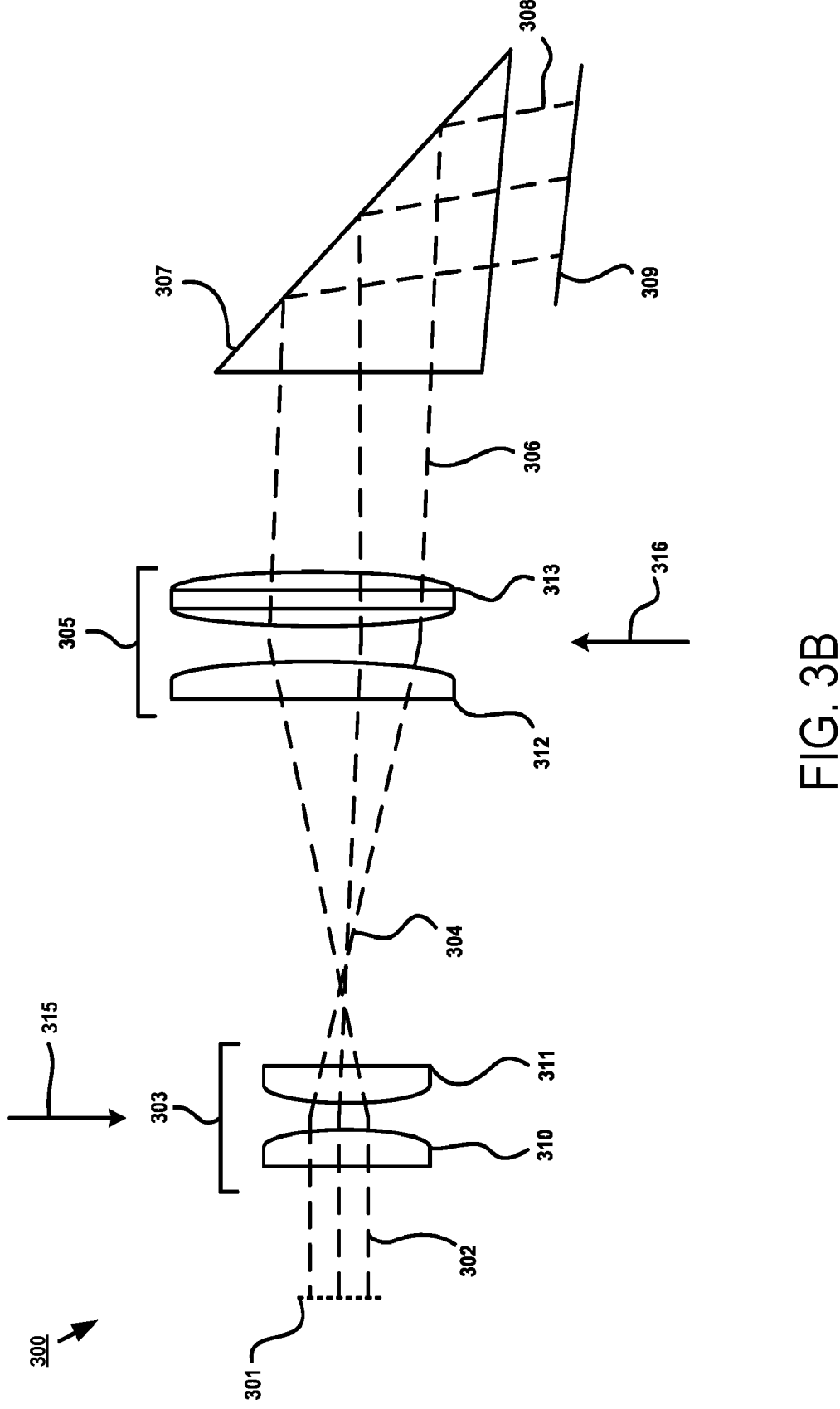

In one exemplary implementation of the present disclosure, the above may be realized by using two lens groups located in series. FIGS. 3A-3B illustrate exemplary optical states of a partial optical system 300 in accordance with the present disclosure. The partial optical system 300 may be one example, at least in part, of the illumination optics 103 and the DMD 105.

In particular, FIG. 3A illustrates an integrating rod 301 or other uniformity correcting device (of which only the output surface is illustrated), a first light 302, a first lens group 303, a second light 304, a second lens group 305, a third light 306, a prism 307, a fourth light 308, and a DMD 309. Both the first lens group 303 and the second lens group 305 are configured for lateral adjustment (e.g., lateral movement orthogonal to the traveling direction of light). The first lens group 303 is situated optically upstream (and thus farther from the DMD) compared to the second lens group 305. When the first lens group 303 moves in a given direction, the second lens group 305 moves substantially (i.e., ±5%) twice the magnitude of the distance of the first lens group 303, but in the opposite direction, in order to maintain positioning of light on the DMD 309. For explanation purposes, the partial optical system 300 in FIG. 3 is illustrated in an orientation where the first light 302 travels generally horizontally. Accordingly, the first lens group 303 and the second lens group 305 travel generally vertically. Various elements illustrated in FIG. 3A may correspond to various elements (or parts of various elements) illustrated in FIG. 1.

In some examples, the integrating rod 301 may be a component of the light source 101 which receives light from a light emitting element of the light source 101 and outputs light, such that the first light 302 corresponds to the first light 102. In other examples, the integrating rod 301 may be a component of the illumination optics 103, such that the integrating rod 301 receives the first light 102 and integrates it to form the first light 302. In some examples, the first lens group 303, the second lens group 305, and the prism 307 are components of the illumination optics 103, such that the fourth light 308 corresponds to the second light 104. In other examples, the third light 306 corresponds to the second light 104. In some examples, the prism 307 is a total internal reflection (TIR) prism.

The first lens group 303 includes a first lens 310 and a second lens 311. The second lens group 305 includes a third lens 312 and a fourth lens 313. Although shown as including two lenses, the first lens group 303 and the second lens group 305 may be composed of any number of lenses to direct the first light 302 to the DMD 309 at the determined angle. Moreover, while each individual lens is separately illustrated, individual lenses within a group may be cemented to one another. Additionally, each lens group may be composed of any type of lenses, such as concave lenses, convex lenses, biconcave lenses, biconvex lenses, planoconcave lenses, planoconvex lenses, negative meniscus lenses, and positive meniscus lenses. In implementations where each lens group includes multiple individual lenses, the lenses may be rigidly connected such that they move together.

The DMD 309 may correspond to the DMD 105. For ease of explanation, the DMD 309 is illustrated as a flat surface; however, in practice the DMD 309 includes a plurality of individual reflective elements that may or may not be oriented along the same plane. In this manner, the DMD 309 may have a structure as illustrated in FIGS. 2A-2B so as to selectively reflect and direct the fourth light 308 (i.e., the second light 104) depending on whether individual reflective components of the DMD 309 are in the on position, the off position, or the neutral position. In order to provide an appropriate contrast ratio and image clarity, the fourth light 308, once reflected by the DMD 309 (i.e., the third light 106), should be centered on a predetermined location such as the aperture (e.g., the first projection optics 107, the filter 109, and the second projection optics 111).

In the state illustrated in FIG. 3A, the first lens group 303 and the second lens group 305 are each positioned such that the fourth light 308 that exits the prism 307 is centered on the DMD 309, and the fourth light 308 is angled such that it contacts the DMD 309 at 24°, relative to the surface normal of the DMD 309. The first light 302 travels along a horizontal optical axis from the integrating rod 301 to the first lens group 303. In practice, the first light 302 expands as it travels, such that it subtends a non-zero solid angle at a surface of the first lens group 303. A surface of the first lens group 303 receives the first light 302 and directs the light, as the second light 304, to the second lens group 305. A surface of the second lens group 305 receives the second light 304 and directs the light, as the third light 306, to the prism 307 such that the fourth light 308 is centered on the DMD 309. When the micromirrors 202 are "on," the micromirror is tilted at a negative 12°, and the fourth light 308 is projected through the projection lens. When the micromirrors 202 are "off," the mirror is tilted at a positive 12°, and the fourth light 308 is projected to a light dump, as previously described.

When the micromirrors of the DMD 309 are tilted in the on state at an angle of 12°, the fourth light 308 should be angled at 24° to maintain a centered point of incidence in the aperture stop 109. To achieve this, the first lens group 303 is adjusted at a first amount (e.g., a first distance) in the first direction 315, and the second lens group 305 is adjusted at a second amount (e.g., a second distance) in the second direction 316. Additionally, due to the magnification ratio of the illumination optical system 300, a magnitude of the second amount of adjustment corresponding to the second lens group 305 is substantially twice a magnitude of the first amount of adjustment corresponding to the first lens group 303 such that the point of incidence is centered on the first projection optics 107.

In practice, however, any deviation in the nominal tilt angle of the micromirrors of the DMD 309 (or the DMD 105) will result in a shift in the point of incidence of the third light 106 on the first projection optics 107. Also, the fourth light 308 being angled at any angle other than 24° will no longer keep the fourth light 108 centered in the aperture stop 109. These shifts may be counteracted by adjusting the first lens group 303 and the second lens group 305. For example, as illustrated in FIG. 3B, the first lens group 303 may shift in a first direction 315 and the second lens group 305 may shift in a second direction 316. The first direction 315 and the second direction 316 may each be perpendicular (e.g., lateral) to the direction of the first light 302. Accordingly, the first direction 315 is substantially perpendicular to an optical axis of the first lens group 303, and the second direction 316 is substantially perpendicular to an optical axis of the second lens group 305. Additionally, the first direction 315 and the second direction 316 may be opposites. For example, should the first direction 315 is in a positive y-axis direction, the second direction 316 is in a negative y-axis direction.

Dual Lens Adjustment Method

Figure 4:
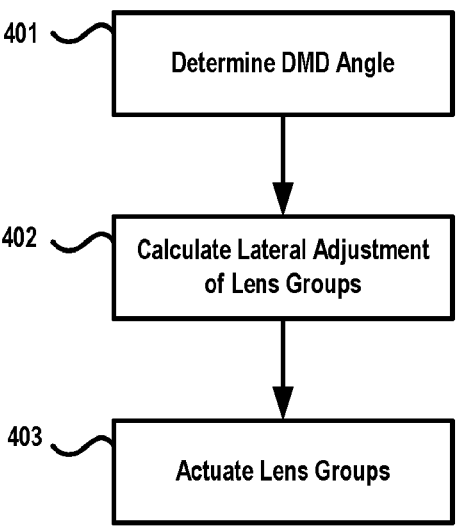
FIG. 4 illustrates an exemplary adjustment method in the exemplary optical system of FIGS. 3A-3B.

FIG. 4 illustrates an exemplary adjustment or alignment method, which may be performed during the calibration of the partial optical system 300 illustrated in FIGS. 3A-3B. The adjustment method of FIG. 4 may be performed in an automated manner, for example, through a computer program as will be described in more detail below.

At operation 401, the adjustment method determines an angle of orientation, or a deviation in the angle of orientation from the expected angle, of the DMD micromirrors 202. Additionally or alternatively, the angle of orientation may be determined indirectly by, for example, illuminating the DMD 309 at a known angle and measuring the output angle of reflected light. In some implementations, operation 401 may be performed in a test fixture before the DMD 309 is installed on its prism assembly.

At operation 402, the adjustment method calculates the appropriate amount of lateral adjustments for the first lens group 303 and the second lens group 305, based on the measured tilt angle of the DMD micromirrors 202. The appropriate amount of lateral adjustments may be the amount which causes the third light 106 to be centered on the DMD 309 and in the projection aperture 109. The calculations of operation 402 may be performed through the use of a computer program that receives a single input (the tilt angle of the DMD micromirrors 202, or the tilt angle of the DMD micromirrors 202 relative to the expected angle) and outputs amounts of lateral adjustment for the first lens group 303 and the second lens group 305.

The calculations of operation 402 may be carried out at a time of calibration, or may be performed beforehand and stored in a lookup table associated with the projection system 100. In such an implementation, the calibration method may calculate the appropriate mirror angle adjustment by referencing the lookup table.

After the above calculations of operation 402, at operation 403, the adjustment method actuates the first lens group 303 and the second lens group 305 to implement the calculated lateral adjustments. This actuation may be implemented using a stepper motor, servo motor, or other appropriate adjustment mechanism. For example, the first lens group 303 and the second lens group 305 may be coupled to a first track and a second track, respectively. The first track and the second track may be coupled (e.g., by a mechanical linkage) such that a movement of the first lens group 303 along the first track causes a corresponding movement of the second lens group 305 along the second track. The first lens group 303 may be actuated in the first direction 315 by actuating the first track such that the first lens group 303 is at a first position, as calculated in operation 402. The second lens group 305 may be actuated in the second direction 316 by actuating the second track such that the second lens group 305 is at a second position, as calculated in operation 402. In some examples, the actuation is performed under the control of the controller 114 of FIG. 1. In other examples, the actuation is performed under manual control.

Dual Lens Grouping Calibration System

Figure 5:
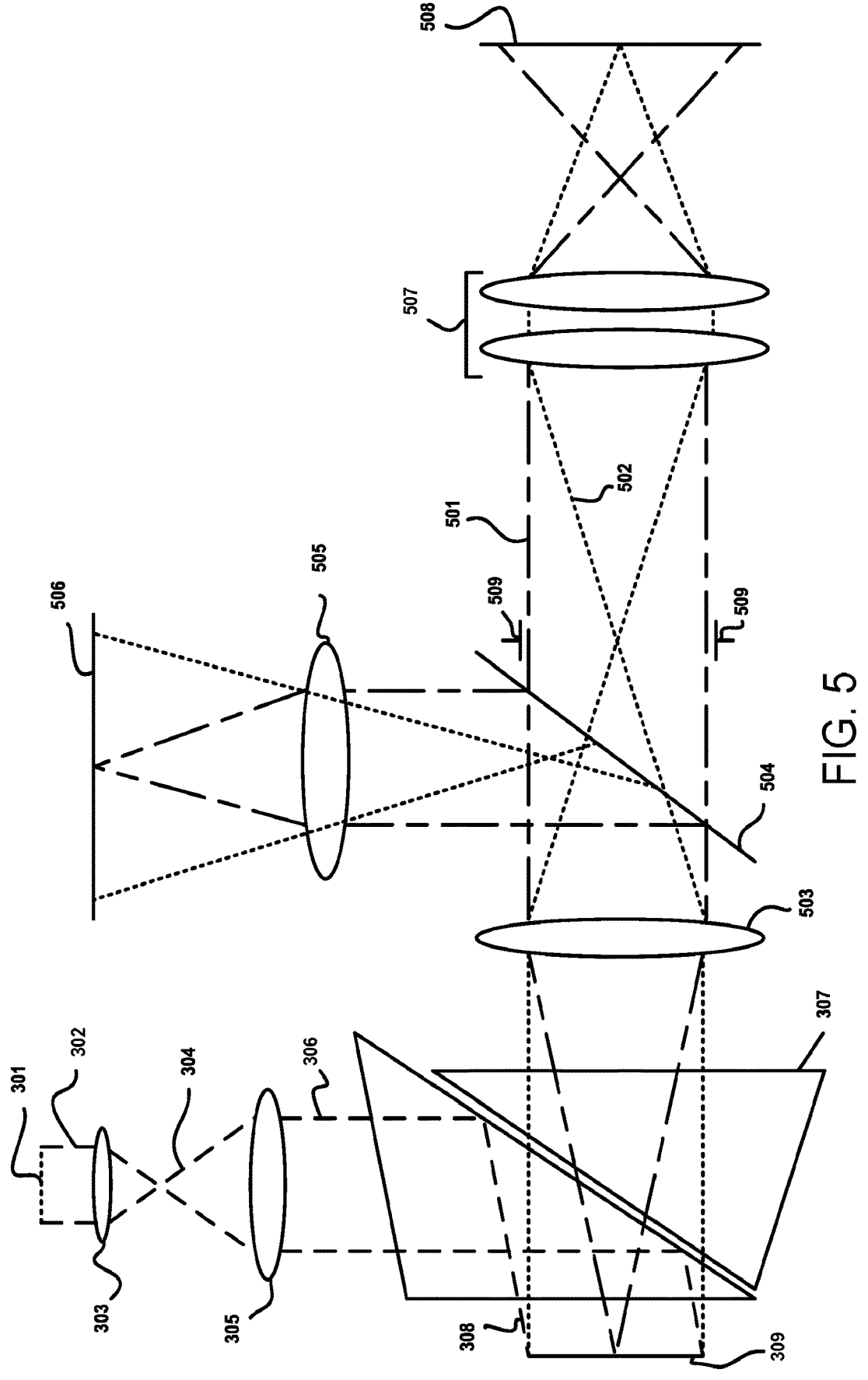
FIG. 5 illustrates an exemplary calibration system according to various aspects of the present disclosure.

FIG. 5 illustrates an exemplary partial optical system 500 for calibrating the projection system 100. Some elements of the system 500 are equivalent to elements in the system 300 illustrated in FIGS. 3A-B. Equivalent elements are illustrated using the same reference numerals. The system 500 includes the integrating rod 301, the first light 302, the first lens group 303, the second light 304, the second lens group 305, the third light 306, the prism 307, the fourth light 308, and the DMD 309. Additionally, the system 500 includes a fifth light 501, a sixth light 502, a first projection lens 503, a beam splitter 504, a second projection lens 505, a first screen 506, a third projection lens 507 (illustrated as a group of lenses), a second screen 508, and an aperture stop 509. The first projection lens 503, the second projection lens 505, and the first screen 506 may be the same as or similar to the first projection optics 107, the second projection optics 111, and the screen 113 illustrated in FIG. 1, respectively. The fifth light 501, represented by the long dash short dash lines, is marginal rays of the system. Where the rays of the fifth light 501 converge indicates the location of a projected image of the DMD 309. The sixth light 502, represented by half dash lines, is chief rays of the system. Where the rays of the sixth light 502 converge indicates the aperture stop 509 or an image of the aperture stop 509.

The beam splitter 504 splits the fifth light 501 and the sixth light 502 such that the rays of the fifth light 501 converge on the first screen 506 and the rays of the sixth light 502 converge on the second screen 508. Accordingly, the image projected by the DMD 309 is reflected on the first screen 506. Specifically, a diffraction pattern projected by the DMD 309 may be used for calibrating the projection system 100. The image of the aperture stop 509 is projected on the second screen 508. The first screen 506 may be, for example, the screen 113 of FIG. 1. Each image may assist with calibrating the projection system 100. For example, a technician of the projection system 100 may view both the diffraction pattern on the first screen 506 and the actual image of the aperture stop 509 on the second screen 508 while calibrating the projection system 100. For purposes of calibration or testing, an assembly including the beam splitter 504 and the second lens 505 may be configured for insertion into the path of the fifth light 501 and the second light 502. After calibration is complete, the assembly may be removed from the path.

Dual Lens Calibration Method

Figure 6:
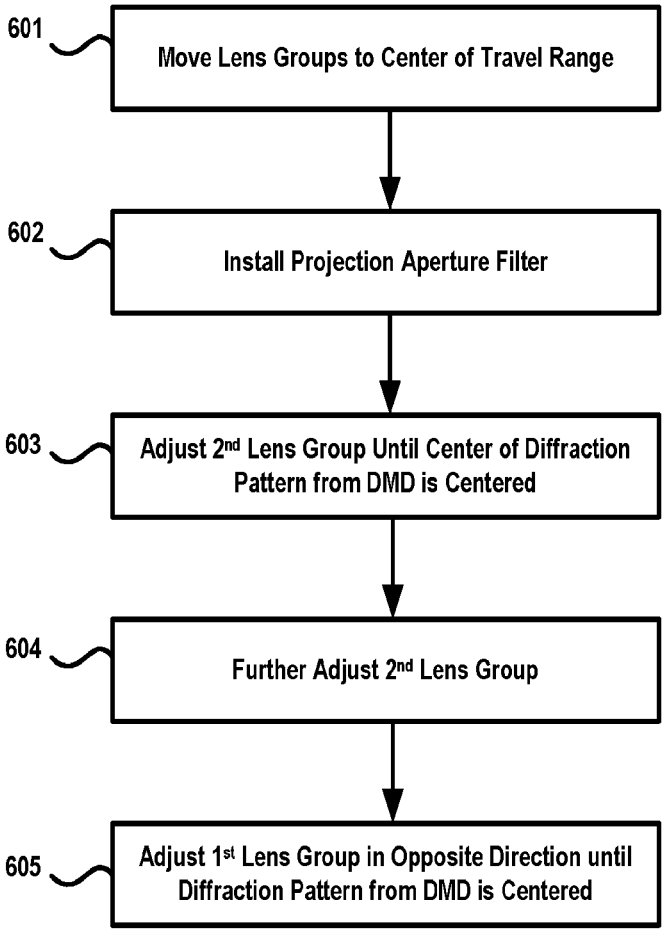
FIG. 6 illustrates an exemplary calibration method of the exemplary calibration system of FIG. 5.

FIG. 6 illustrates an exemplary calibration method, which may be performed during the calibration of the partial optical system 500 illustrated in FIG. 5. The calibration method of FIG. 6 may be manually performed in order to set the initial positions of the first lens group 303 and the second lens group 305.

At operation 601, the first lens group 303 and the second lens group 305 are moved to the center of their range of travel. For example, the center of the first track and the second track, as previously described. In some implementations, the center of their range of travel aligns with the center of a face of the integrating rod 301.

At operation 602, a projection aperture filter is installed, such as filter 109 of FIG. 1. The filter 109 may include an aperture configured to pass a predetermined diffractive order, or predetermined illumination angle, of the fourth light 108 or the fourth light 308. For example, the filter 109 may include a "Fourier part" or "Fourier lens assembly" which refers to an optical system that spatially Fourier transforms modulated light (e.g., light from the DMD 105) by focusing the modulated light onto a Fourier plane. The spatial Fourier transform imposed by the Fourier part converts the propagation angle of each diffraction order of the modulated light to a corresponding spatial position on the Fourier plane. The Fourier part thereby enables selection of desired diffraction orders, and rejection of undesired diffraction orders, by spatial filtering at the Fourier plane. For example, the Fourier part may be configured to pass projected light at an angle of 2°. The spatial Fourier transform of the modulated light at the Fourier plane is equivalent to a Fraunhofer diffraction pattern of the modulated light.

At operation 603, the second lens group 305 is adjusted until the center of the diffraction pattern from the DMD 309 is centered on the second screen 508. For example, the fifth light 501 may be a random noise pattern. When the fifth light 501 is projected onto the second screen 508, the viewed diffraction pattern (e.g., spatial frequency) is a sinc e function. As the second lens group 305 is laterally adjusted, the diffraction pattern of the fifth light 501 shifts. Once the diffraction pattern is centered in the image of the aperture stop 509, the second lens group 305 is at a third position. At operation 604, the second lens group 305 is adjusted further. In some implementations, the second lens group 305 is laterally adjusted such that a final calibration position of the second lens group 305 is one-third of the distance of the third position, using the center of the second track as reference.

At operation 605, the first lens group 303 is adjusted until the center of the diffraction pattern from the DMD 309 is centered on the second screen 508. For example, the fifth light 501 is projected onto the second screen 508. As the first lens group 303 is laterally adjusted, the diffraction pattern of the fifth light 501 shifts. Once the diffraction pattern is centered, the first lens group 303 is at a final calibration position. In some implementations, the technician performing the calibration may refer to the first screen 506 to ensure a clear image is projected and that the DMD 309 is fully illuminated. The final calibration positions of the first lens group 303 and the second lens group 305 are stored in the memory of the controller 114 (e.g., the look-up table) as initial positions of the first lens group 303 and the second lens group 305.

The above projection systems and calibration methods may provide for a configuration having illumination optics which are able to adjust and maintain the proper illumination angle, maintain position of the illumination, and perform all this in an architecture which uses a first lens group and a second lens group.

Systems, methods, and devices in accordance with the present disclosure may take any one or more of the following configurations.

(1) A projection system, comprising: a light source configured to emit a light in response to an image data; an illumination optical system configured to steer the light, the illumination optical system including a first lens group and a second lens group; a digital micromirror device including a plurality of micromirrors, wherein a respective micromirror is configured to reflect the steered light to a predetermined location as on-state light in a case where the respective micromirror is in an on position and to reflect the steered light to a light dump as off-state light in a case where the respective micromirror is in an off position; and a controller configured to: determine a deviation between an actual angle of orientation of a respective micromirror of the plurality of micromirrors of the digital micromirror device and an expected angle of orientation of the respective micromirror of the plurality of micromirrors of the digital micromirror device, calculate a first amount of lateral adjustment corresponding to the first lens group and a second amount of lateral adjustment corresponding to the second lens group, and actuate the first lens group in a first direction according to the first amount and the second lens group in a second direction according to the second amount, thereby to maintain a position of the steered light on the digital micromirror device.

(2) The projection system according to (1), wherein the second direction is opposite the first direction.

(3) The projection system according to any one of (1) to (2), wherein the first direction is substantially perpendicular to an optical axis of the first lens group, and the second direction is substantially perpendicular to an optical axis of the second lens group.

(4) The projection system according to any one of (1) to (3), wherein a magnitude of the second amount of lateral adjustment corresponding to the second lens group is substantially twice a magnitude of the first amount of lateral adjustment corresponding to the first lens group.

(5) The projection system according to any one of (1) to (4), further comprising a filter, wherein the filter includes an aperture configured to pass a predetermined diffractive order of the reflected light.

(6) The projection system according to any one of (1) to (5), further comprising a total internal reflection prism disposed optically between the second lens group and the digital micromirror device.

(7) The projection system according to any one of (1) to (6), wherein calculating the first amount and the second amount includes matching the deviation with the first amount of lateral adjustment and the second amount of lateral adjustment using a look-up table stored in a memory of the controller.

(8) The projection system according to any one of (1) to (7), wherein the first lens group is coupled to a first track and the second lens group is coupled to a second track.

(9) The projection system according to (8), wherein actuating the first lens group in the first direction includes actuating the first track such that the first lens group is at a first position, and actuating the second lens group in the second direction includes actuating the second track such that the second lens group is at a second position.

(10) The projection system according to any one of (1) to (9), wherein the first lens group includes a plurality of first lenses, and the second lens group includes a plurality of second lenses.

(11) A method of calibrating a projection system including a light source configured to emit a light in response to an image data, an illumination optical system configured to steer the light, the illumination optical system including a first lens group and a second lens group, and a digital micromirror device including a plurality of micromirrors respectively configured to reflect the steered light to a predetermined location as on-state light in a case where the respective micromirror is in an on position and to reflect the steered light to a light dump as off-state light in a case where the respective micromirror is in an off position, the method comprising: determining a deviation between an actual angle of orientation of a respective micromirror of the plurality of micromirrors of the digital micromirror device and an expected angle of orientation of the respective micromirror of the plurality of micromirrors of the digital micromirror device, calculating a first amount of lateral adjustment corresponding to the first lens group and a second amount of lateral adjustment corresponding to the second lens group, and actuating the first lens group in a first direction according to the first amount and the second lens group in a second direction according to the second amount, thereby to maintain a position of the steered light on the digital micromirror device.

(12) The method according to (11), wherein the first direction is substantially perpendicular to an optical axis of the first lens group, and the second direction is substantially perpendicular to an optical axis of the second lens group.

(13) The method according to (11) or (12), wherein a magnitude of the second amount of lateral adjustment corresponding to the second lens group is substantially twice a magnitude of the first amount of lateral adjustment corresponding to the first lens group.

(14) The method according to any one of (11) to (13), wherein the projection system includes a filter, wherein the filter includes an aperture configured to pass a predetermined diffractive order of the reflected light.

(15) The method according to any one of (11) to (14), wherein the projection system includes a total internal reflection prism disposed optically between the second lens group and the digital micromirror device.

(16) The method according to any one of (11) to (15), wherein calculating the first amount and the second amount includes matching the deviation with the first amount of lateral adjustment and the second amount of lateral adjustment using a look-up table.

(17) The method according to any one of (11) to (16), wherein the first lens group is coupled to a first track and the second lens group is coupled to a second track.

(18) The method according to (17), wherein actuating the first lens group in the first direction includes actuating the first track such that the first lens group is at a first position, and actuating the second lens group in the second direction includes actuating the second track such that the second lens group is at a second position.

(19) The method according to any one of (11) to (18), wherein the first lens group includes a plurality of first lenses, and the second lens group includes a plurality of second lenses.

(20) A non-transitory computer-readable medium storing instructions that, when executed by a processor of a projection system, cause the projection system to perform operations comprising the method according to any one of (11) to (19).

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments incorporate more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A projection system, comprising:
a light source configured to emit a light in response to an image data;
an illumination optical system configured to steer the light, the illumination optical system including a first lens group and a second lens group;
a digital micromirror device including a plurality of micromirrors, wherein a respective micromirror is configured to reflect the steered light to a predetermined location as on-state light in a case where the respective micromirror is in an on position and to reflect the steered light to a light dump as off-state light in a case where the respective micromirror is in an off position; and
a controller configured to:
determine a deviation between an actual angle of orientation of a respective micromirror of the plurality of micromirrors of the digital micromirror device and an expected angle of orientation of the respective micromirror of the plurality of micromirrors of the digital micromirror device,
calculate a first amount of lateral adjustment corresponding to the first lens group and a second amount of lateral adjustment corresponding to the second lens group, and
actuate the first lens group in a first direction according to the first amount and the second lens group in a second direction according to the second amount, thereby to maintain a position of the steered light on the digital micromirror device.

2. The projection system according to claim 1, wherein the second direction is opposite the first direction.

3. The projection system according to claim 1, wherein the first direction is substantially perpendicular to an optical axis of the first lens group, and the second direction is substantially perpendicular to an optical axis of the second lens group.

4. The projection system according to claim 1, wherein a magnitude of the second amount of lateral adjustment corresponding to the second lens group is substantially twice a magnitude of the first amount of lateral adjustment corresponding to the first lens group.

5. The projection system according to claim 1, further comprising a filter, wherein the filter includes an aperture configured to pass a predetermined diffractive order of the reflected light.

6. The projection system according to claim 1, further comprising a total internal reflection prism disposed optically between the second lens group and the digital micromirror device.

7. The projection system according to claim 1, wherein calculating the first amount and the second amount includes matching the deviation with the first amount of lateral adjustment and the second amount of lateral adjustment using a look-up table stored in a memory of the controller.

8. The projection system according to claim 1, wherein the first lens group is coupled to a first track and the second lens group is coupled to a second track.

9. The projection system according to claim 8, wherein actuating the first lens group in the first direction includes actuating the first track such that the first lens group is at a first position, and actuating the second lens group in the second direction includes actuating the second track such that the second lens group is at a second position.

10. The projection system according to claim 1, wherein the first lens group includes a plurality of first lenses, and the second lens group includes a plurality of second lenses.

11. A method of calibrating a projection system including a light source configured to emit a light in response to an image data, an illumination optical system configured to steer the light, the illumination optical system including a first lens group and a second lens group, and a digital micromirror device including a plurality of micromirrors respectively configured to reflect the steered light to a predetermined location as on-state light in a case where the respective micromirror is in an on position and to reflect the steered light to a light dump as off-state light in a case where the respective micromirror is in an off position, the method comprising:

determining a deviation between an actual angle of orientation of a respective micromirror of the plurality of micromirrors of the digital micromirror device and an expected angle of orientation of the respective micromirror of the plurality of micromirrors of the digital micromirror device, calculating a first amount of lateral adjustment corresponding to the first lens group and a second amount of lateral adjustment corresponding to the second lens group, and actuating the first lens group in a first direction according to the first amount and the second lens group in a second direction according to the second amount, thereby to maintain a position of the steered light on the digital micromirror device.

12. The method according to claim 11, wherein the first direction is substantially perpendicular to an optical axis of the first lens group, and the second direction is substantially perpendicular to an optical axis of the second lens group.

13. The method according to claim 11, wherein a magnitude of the second amount of lateral adjustment corresponding to the second lens group is substantially twice a magnitude of the first amount of lateral adjustment corresponding to the first lens group.

14. The method according to claim 11, wherein the projection system includes a filter, wherein the filter includes an aperture configured to pass a predetermined diffractive order of the reflected light.

15. The method according to claim 11, wherein the projection system includes a total internal reflection prism disposed optically between the second lens group and the digital micromirror device.

16. The method according to claim 11, wherein calculating the first amount and the second amount includes matching the deviation with the first amount of lateral adjustment and the second amount of lateral adjustment using a look-up table.

17. The method according to claim 11, wherein the first lens group is coupled to a first track and the second lens group is coupled to a second track.

18. The method according to claim 17, wherein actuating the first lens group in the first direction includes actuating the first track such that the first lens group is at a first position, and actuating the second lens group in the second direction includes actuating the second track such that the second lens group is at a second position.

19. The method according to claim 11, wherein the first lens group includes a plurality of first lenses, and the second lens group includes a plurality of second lenses.

20. A non-transitory computer-readable medium storing instructions that, when executed by a processor of a projection system, cause the projection system to perform operations comprising the method according to claim 11.

* * * * *